(12) United States Patent
Breeuwer et al.

(10) Patent No.: US 7,257,159 B1
(45) Date of Patent: *Aug. 14, 2007

(54) METHOD FOR CODING VIDEO PICTURES BY DETERMINING A SUB-TARGET VALUE FOR THE NUMBER OF BITS PER SUB-SERIES OF COEFFICIENTS

(75) Inventors: Marcel Breeuwer, Eindhoven (NL); Reinier B. M. Klein Gunnewiek, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 1826 days.

(21) Appl. No.: 08/604,698

(22) Filed: Feb. 21, 1996

(30) Foreign Application Priority Data

Feb. 24, 1995 (EP) .................................. 95200449

(51) Int. Cl.
*H04N 7/12* (2006.01)
(52) U.S. Cl. ................................. 375/240.03
(58) Field of Classification Search ................ 348/405, 348/419, 390, 384, 412, 413, 415; 382/251; 375/240.03; *H04N 7/12*
See application file for complete search history.

(56) References Cited

U.S. PATENT DOCUMENTS 4,442,454 A    4/1984  Powell ........................ 358/167
5,144,424 A *  9/1992  Savatier ....................... 348/405
5,283,646 A *  2/1994  Bruder ......................... 348/415
5,426,463 A *  6/1995  Reininger et al. ............. 348/405
5,606,371 A *  2/1997  Klein Gunnewiek et al. ............................ 348/405
5,640,208 A *  6/1997  Fujinami ...................... 348/413

FOREIGN PATENT DOCUMENTS

GB    2251756 A    7/1992
JP    3062789      3/1991
JP    4111591      4/1992

OTHER PUBLICATIONS

"Hardware Implementation of the Framestore and Data Rate Control for a Digital HDTV-VCR" K. Gruneberg et al, HDTV Symposium, Japan, Nov. 1992.

* cited by examiner

*Primary Examiner*—Young Lee
(74) *Attorney, Agent, or Firm*—Larry Liberchuk

(57) ABSTRACT

The bitrate control of known video encoders is based on a control of the quantization step size per picture block. In transform coding of relatively large picture blocks, the video picture comprises a too small number of picture blocks to obtain a desired number of bits per picture. In conformity with the invention, the target value for the number of bits per picture block is divided into N sub-targets ($R_t(k,n)$). The series of coefficients of a picture block is divided into N segments ($L(n)$) with reference to an estimation for the cumulative distribution 20 of the bit cost per picture block. The quantization step size is subsequently adapted per segment to the corresponding sub-target. Since the number of segments is N times larger than the number of picture blocks, an accurate bitrate control is possible. If desired, the estimation for the cumulative distribution is adapted from picture to picture.

5 Claims, 4 Drawing Sheets

METHOD FOR CODING VIDEO PICTURES BY DETERMINING A SUB-TARGET VALUE FOR THE NUMBER OF BITS PER SUB-SERIES OF COEFFICIENTS

FIELD OF THE INVENTION

The invention relates to a device and a method for coding and decoding video pictures.

BACKGROUND OF THE INVENTION

A known device for coding video pictures is described in "Hardware Implementation of the Framestore and Data Rate Control for a Digital HDTV-VCR" presented at the HDTV Symposium in Japan, November 1992. The known device comprises a picture transformer for obtaining a series of coefficients which is representative of a picture block, a quantizer for quantizing the series of coefficients with a step size, and an encoder for coding the series of coefficients. Moreover, the known device comprises control means for controlling the step size in conformity with a target value for the number of bits per series of coefficients.

The device supplies a bit stream with a variable bitrate. To obtain a fixed bitrate per picture (or group of pictures), the known device comprises a buffer in which the bit stream is written at a variable bitrate and is read at the fixed bitrate. The quantization step size is controlled with the aid of the control means in such a way that the buffer maintains a desired fullness. The control means of the known device update the quantization step size per macroblock, i.e. one or more contiguous picture blocks.

A picture transform mode which is often used is Discrete Cosine Transform (DCT). This transform is performed with relatively small, contiguous picture blocks of, for example 8*8 pixels. The Lapped Orthogonal Transform (LOT) is currently in the limelight due to the absence of block artefacts. In this transform mode, the picture blocks partly overlap each other, for example by 50% in both the horizontal and the vertical direction. Notably for storage of X-ray angiographic pictures for medical applications, the LOT has appeared to be interesting. However, the X-ray picture characteristics are different from conventional video pictures. The dimensions of the picture blocks are therefore considerably larger. X-ray pictures having a dimension of 512*512 pixels appear to be optimally coded at a block size of 64*64 pixels with an overlap of 50%. After transform, this yields 256 blocks of 1024 coefficients each for each picture.

A problem of the known device is that with its step size control a fixed bitrate cannot be satisfactorily obtained per picture if the number of blocks is too small. The average bitrate is constant over a large number of pictures, but the bitrate may fluctuate to an unwanted large extent per picture. For comparison: a normal video picture comprises several thousand picture blocks. With such a number, a fixed bitrate per picture can be obtained within a margin of, for example 0.5%.

OBJECT AND SUMMARY OF THE INVENTION

It is an object of the invention to obviate the above-mentioned drawbacks.

To this end, the device according to the invention is characterized in that the device is provided with dividing means for dividing the series of coefficients into sub-series and for determining a sub-target value for the number of bits per sub-series, the control means being adapted to control the step size per sub-series in conformity with the corresponding sub-target value.

It is thereby achieved that the control means control the step size per sub-series, as if they were smaller picture blocks. The actual picture block dimensions are, however, unmodified and may be optimally adapted to the desired transform. The number of sub-series per picture is N times the number of picture blocks and can be freely chosen. The value of N can be chosen to be such that a desired bitrate per picture can be obtained within a very small margin. Moreover, it is achieved that the variation of the step size within a picture is very small. Notably for medical picture sequences, this is an extremely important aspect because a large variation leads to an inhomogeneous picture quality.

The sub-target values within a picture block are preferably equally large. The corresponding sub-series can be derived from a predetermined destination of the cumulative distribution of the bits among the coefficients of a picture block. A sensible estimation of the cumulative distribution is obtained from a statistical analysis of a large number of pictures. Such an estimation is eminently suitable for coding the first picture of a picture sequence. For the further pictures of a sequence, the estimation can be derived from the coding results of already coded pictures from the picture sequence.

DESCRIPTION OF EMBODIMENTS

Figure 1:
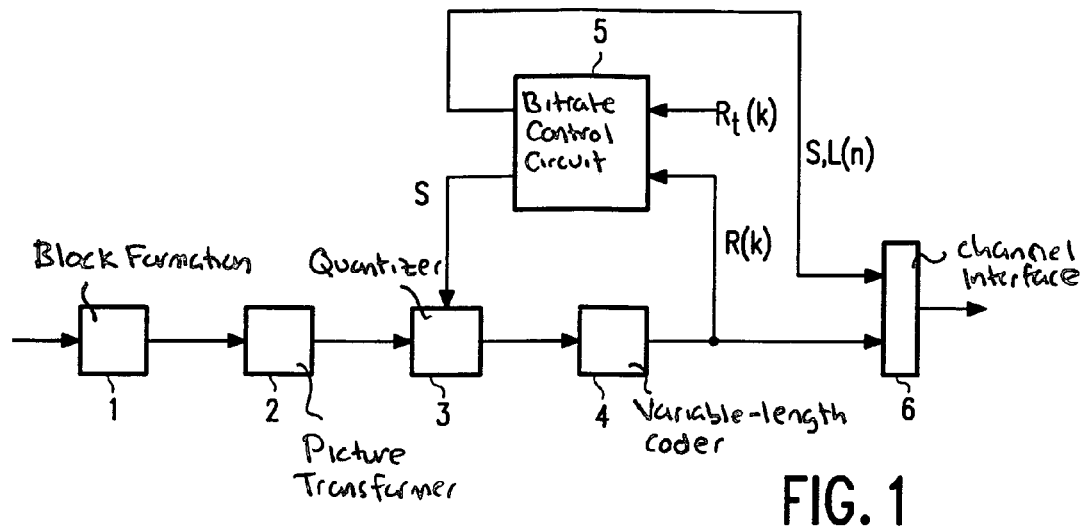
FIG. 1 shows a device for coding video pictures according to the invention.

FIG. 1 shows a device for coding video pictures in accordance with the invention. The device comprises block formation means 1 in which each video picture is divided into picture blocks having a dimension of, for example 64×64 pixels overlapping each other by 50%. The picture blocks are applied to a picture transformer 2. In this transformer the picture blocks are subjected to a Lapped Orthogonal Transform (LOT). An embodiment of such a picture transformer is described in United States Patent U.S. Pat. No. 4,442,454. Non-overlapping picture transforms such as the Discrete Cosine Transform are, however, alternatively possible. In the LOT, each picture block is transformed to a 2-dimensional block of 32*32 coefficients. The 1024 coefficients of a block are read in known manner in a zigzag sequence and applied in the form of a 1-dimensional series to a quantizer 3 which quantizes the coefficients. The quantized coefficients are encoded to digital codewords in a variable-length coder 4 and applied to a transmission channel via channel interface 6.

The quantizer 3 quantizes the series of coefficients with a given step size in dependence upon an applied quantization parameter s. The step size may be the same for all coefficients of a series. In that case, s is the relevant step size. Alternatively, the quantization step size may be dependent in a predetermined manner on the spatial picture frequency, hence on the location of the coefficient in the series. In that case, s is a scale factor. For the sake of simplicity, s will hereinafter be referred to as "step size".

The step size s is applied to the quantizer 3 by a bitrate control circuit 5. This control circuit receives for each picture block k a predetermined target value $R_t(k)$ for the number of bits with which this picture block must be coded. Moreover, the control circuit receives the actually produced bits R(k) for each picture block k from the encoder 4. Dependent on $R_t(k)$ and R(k), the control circuit adapts the step size s per picture block. If more bits than the target value are produced, then the control circuit enlarges the step size. The coefficients are then quantized in a coarser way and the number of bits decreases. If fewer bits than the target value are produced, then the control circuit reduces the step size.

The target value $R_t(k)$ for the number of bits per picture block may be the same for all picture blocks of the picture. However, the target value preferably varies from block to block within a picture. In fact, some picture blocks have a substantially equal brightness, whereas other picture blocks have a high degree of complexity. Algorithms for determining the target value $R_t(k)$ per picture block are known per se. In the known device, said target value is obtained from a preanalysis of the current picture.

In conformity with the invention, the series of 1024 coefficients of a picture block k is split up into N (for example, 4) sub-series with a sub-target value $R_t(k,n)$, n=1 . . . N for the number of bits per sub-series. In an extremely simple embodiment, the series is divided into sub-series of equal length and the sub-target value is equal for each sub-series. However, embodiments in which the sub-target value per sub-series is dependent on the spatial picture frequencies represented by a sub-series are more efficient. Practice has proved that the need for bits decreases as the coefficients represent a higher spatial picture frequency.

Figure 2:
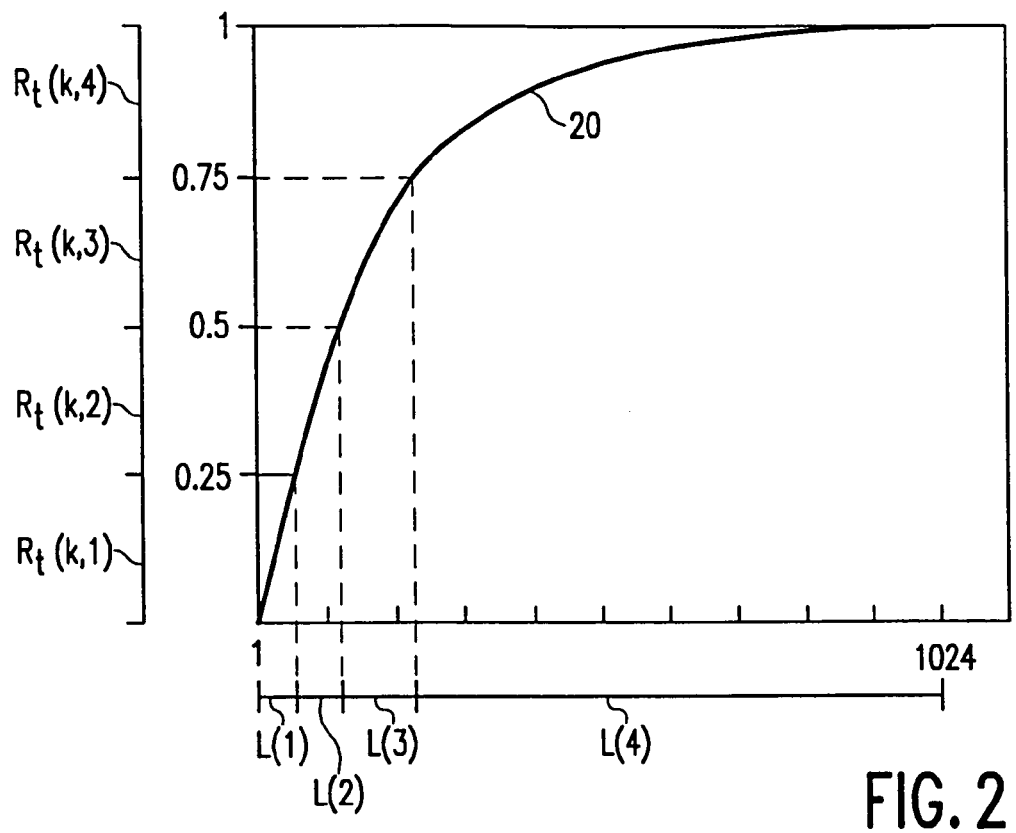
FIGS. 2 and 3 show embodiments of dividing the series of coefficients of a picture block into sub-series.
Figure 3:
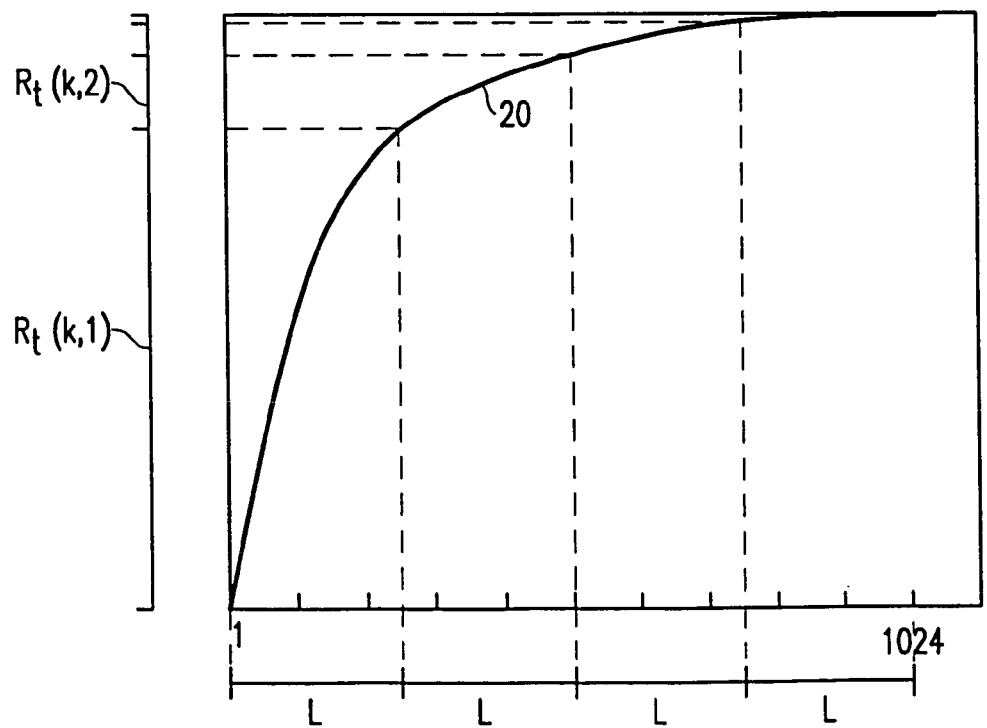

FIG. 2 shows a diagram to explain a possible embodiment for dividing the series of coefficients into sub-series. In this Figure, the reference numeral 20 denotes an estimation of the cumulative distribution of the number of bits which is produced per picture block by a variable-length encoder in practice. The x axis indicates the series of 1024 coefficients, starting with the DC coefficient and ending with the least significant AC coefficient. The value 1 along the y axis represents the total number of bits R(k) per picture block. In the example shown the target value $R_t(k)$ of the number of bits per picture block is divided into N predetermined sub-target values $R_t(k,n)$ (n=1 . . . N). A sensible choice is to divide the target value into N equal sub-target values $R_t(k)/N$. The sub-series thus obtained then have a distinctive series length L(n). FIG. 3 shows a further embodiment. In this embodiment, the N sub-series have a predetermined (for example, equal) length L, and the sub-target value $R_t(k,n)$ for each sub-series is different. A sub-series of coefficients will hereinafter be referred to as a segment. A full image consisting of K picture blocks thus comprises K*N segments.

Figure 4:
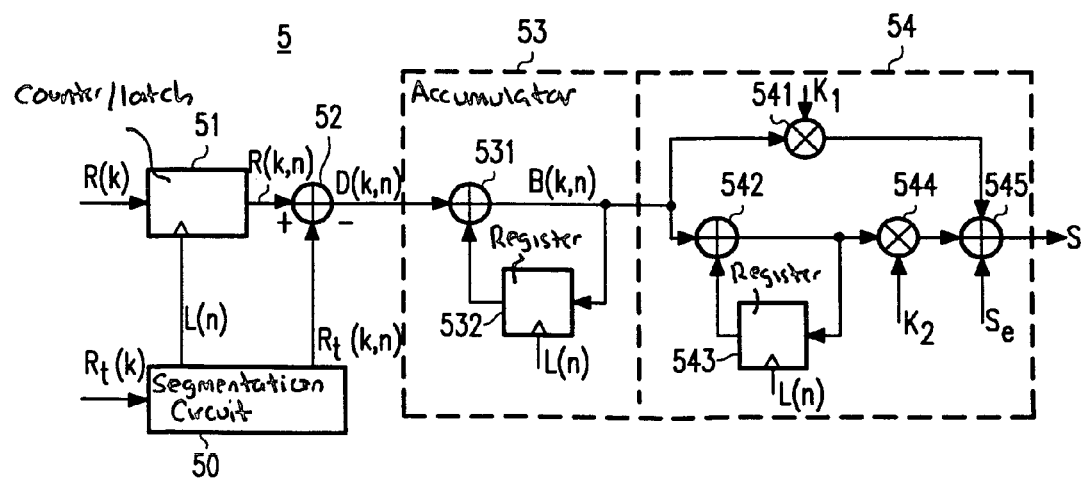
FIG. 4 shows a possible embodiment of a control circuit shown in FIG. 1.

The control circuit 5 shown in FIG. 1 is arranged to adapt the step size per segment. FIG. 4 shows the diagrammatical structure of an embodiment of the control circuit 5. It comprises a counter/latch 51 for counting the number of bits R(k,n) produced per segment n of picture block k by the encoder 4 (see FIG. 1). To this end, the counter/latch receives a latch signal L(n) which is indicative of the length of each segment. The counted number of bits is compared with a target value $R_t(k,n)$ by means of a subtracter circuit 52. The difference D(k,n) formed thereby is accumulated in an accumulator 53 consisting of an adder 531 and a register 532. The accumulated difference B(k,n) is indicative of the extent to which the desired bitrate is achieved with the actual quantization step size. A positive value indicates that too many bits are produced on average and that the step size must be enlarged. A negative value indicates that too few bits are produced on average and that the step size must be reduced.

The step size is controlled in dependence upon the accumulated difference B(k,n) by means of a proportionally integrating (PI) control member 54. This member has a proportional branch (constituted by a multiplier 541) and an integrating branch (constituted by an adder 542, a register 543 and a multiplier 544). Moreover, the PI control member comprises a summing device 545 in which the output of the proportional branch and the integrating branch are added to an initial estimation $s_e$ for the quantization step size. As is apparent from the Figure, the PI control member determines the step size s for the next segment as follows:

$$s = k_1 \cdot B(k,n) + k_2 \cdot \Sigma B(i,j) + s_e$$

in which the summation $\Sigma B(i,j)$ takes place for all already coded segments of the picture and in which $k_1$ and $k_2$ are control constants. The initial estimation $s_e$ for the step size may be a fixed value which is obtained from a statistical analysis of a large number of pictures. It may also be the average step size with which the previous picture has been coded.

As is shown in FIG. 4, the sub-target value $R_t(k,n)$ for the number of bits per segment n of picture block k, as well as the latch signal L(n) for the counter/latch 51 and the registers 532 and 543 are generated by a segmentation circuit 50.

Figure 5:
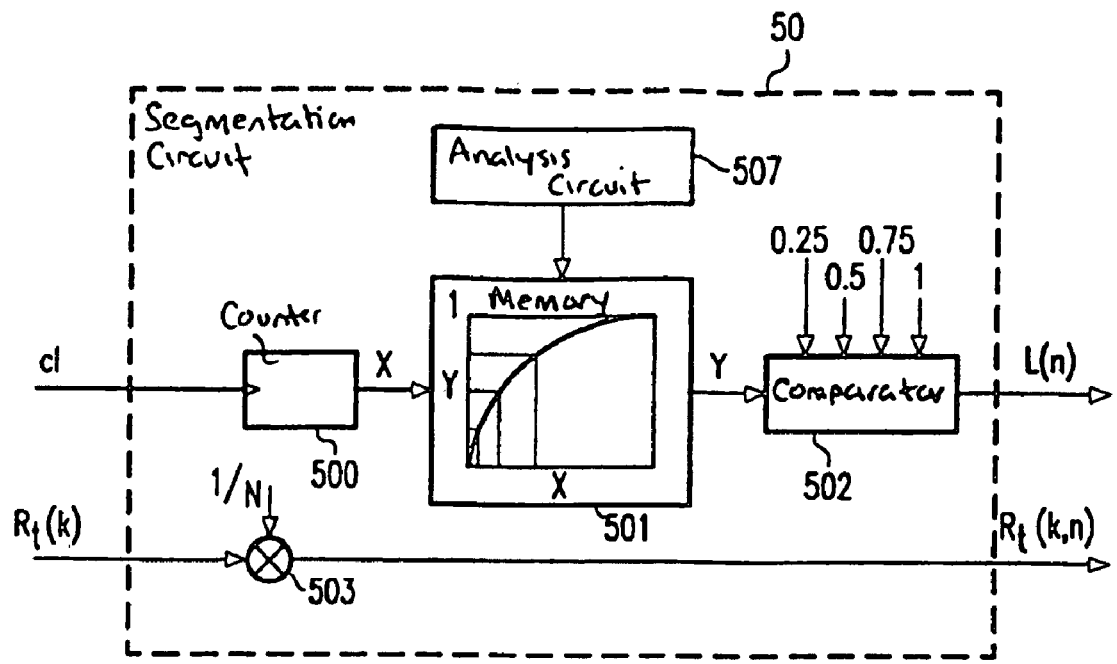
FIGS. 5 and 6 show embodiments of a circuit for the division into sub-series.

FIG. 5 shows a first embodiment of the segmentation circuit 50. This embodiment is adapted to divide a series of coefficients into segments in accordance with FIG. 2. The segmentation circuit receives a clock signal c1 for each coefficient applied by picture transformer 2 to quantizer 3 (see FIG. 1). The clock signal is applied to a coefficient counter 500 which counts down the number of coefficients (1 . . . 1024) per picture block. The count of this counter is applied to a memory 501 in which an estimation of the cumulative distribution of the bit cost per picture block (see FIG. 2) is stored. The applied count represents a value of said cumulative distribution on the x axis. In response to the applied value x, memory 501 supplies the corresponding y value to a comparator 502. As soon as the y value has predetermined values (0.25, 0.50, 0.75 and 1 for N=4), said comparator supplies the latch signal L(n). Moreover, the segmentation circuit receives the target value $R_t(k)$ for the number of bits per picture block. As already elucidated hereinbefore, this value may vary from block to block. The target value $R_t(k)$ is divided by the number of segments N in a multiplier 503 so as to obtain a sub-target value $R_t(k,n)=R_t(k)/N$ per segment.

Figure 6:
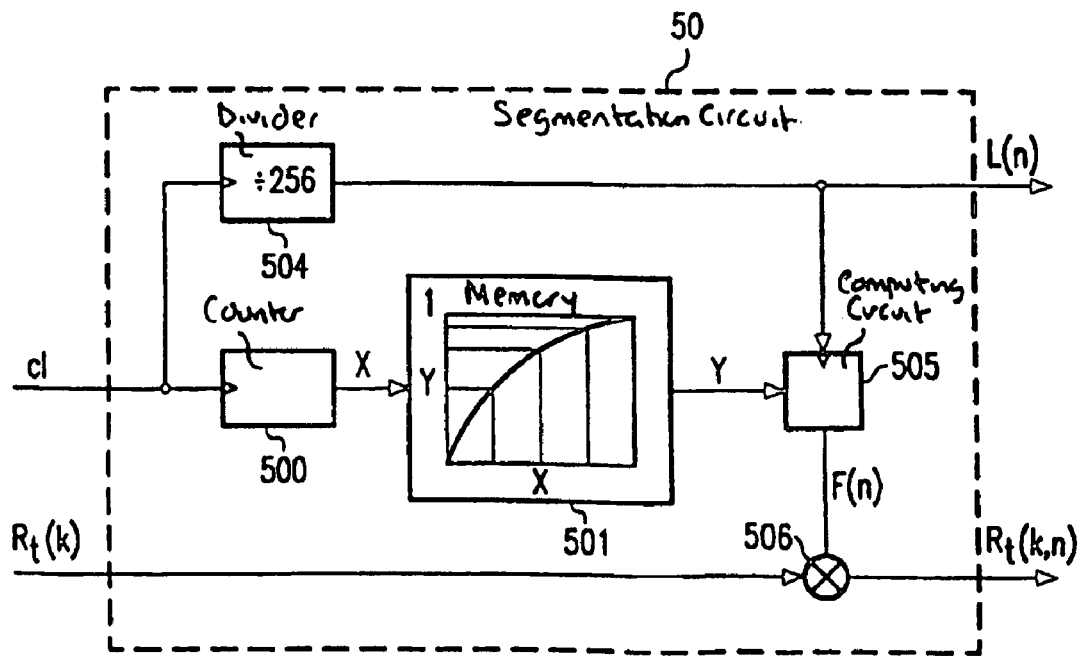

FIG. 6 shows a second embodiment of the segmentation circuit 50. This embodiment is adapted to divide a series of coefficients into segments in accordance with FIG. 3. The segmentation circuit comprises the same coefficient counter 500 and memory 501 as the previous embodiment. The clock signal c1 is now also applied to a divider 504 which generates the latch signal L(n) always after 256 coefficients (N times per picture block). The y value supplied by memory 501 is applied by means of the latch signal to a computing circuit 505. With reference to the actual and the previous y value, this computing circuit determines the fraction F(n) of the number of bits $R_t(k)$ which can be spent on coding of the actual segment. Said fraction F(n) is multiplied in a multiplier 506 by the target value $R_t(k)$ so as to obtain the sub-target value $R_t(k,n)$.

Figure 7:
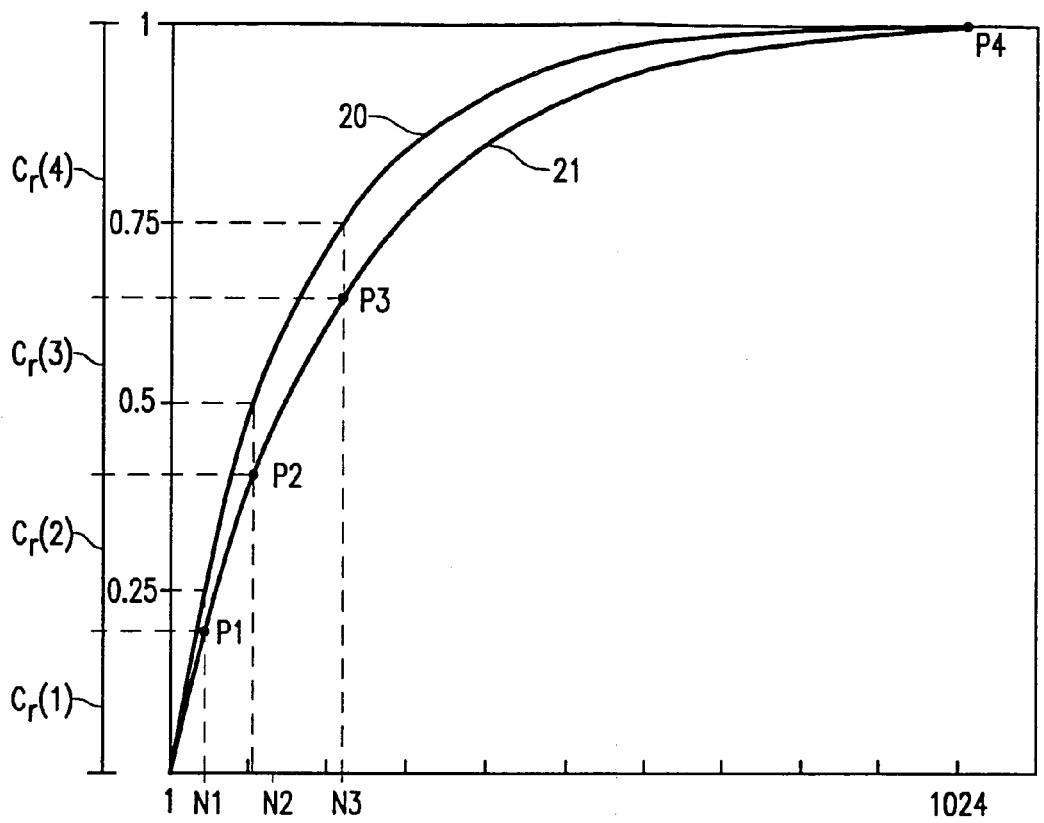
FIG. 7 shows a diagram to explain the circuit shown in FIG. 5.

The memory 501 in FIGS. 5 and 6 may be a ROM in which an estimation once determined for the cumulative distribution of the bit cost per picture block is stored. However, it is alternatively possible and sensible to regularly adapt the cumulative distribution of the bit cost per picture block to the statistics of the picture signal. In this case, the memory is a RAM which is loaded by an analysis circuit, for example, at the start of a picture. For the sake of simplicity, such an analysis circuit is shown in FIG. 5 only and is denoted by 507. FIG. 7 shows a diagram to illustrate an algorithm which is performed by the analysis circuit. In this Figure, the current cumulative bit cost distribution is denoted by 20. The analysis circuit performs the following steps:

1. Storing the produced number of bits R(k,n) for each segment n of each picture block, as well as the step size s(k,n) then used.

2. Determining, per segment, its complexity. The complexity of a segment is defined as:

$$c(k,n) = s(k,n) \cdot R(k,n)$$

3. Determining the average complexity of the nth segments of the picture blocks of a picture:

$$c(n) = \frac{1}{K} \sum_{k=1}^{K} c(k, n)$$

4. Determining the average relative complexity of the segments within a picture block:

$$c_r(n) = \frac{c(n)}{\sum_{n=1}^{N} c(n)} \times 100\%$$

5. Fixing four points P1 ... P4 of a new cumulative bit cost distribution for the next picture with reference to the percentages $c_r(n)$ and the current segment boundaries N1 ... N4 (see FIG. 7).

6. Estimating the new cumulative distribution 21 by computing an interpolation curve through the points P1 ... P4.

7. Loading the new division into memory 501 (see FIGS. 5 and 6) at the start of the next picture.

Since the device according to the invention controls the quantization step size per segment and the number of segments is a factor of N times larger than the number of picture blocks, an accurate bitrate control is possible. Practical experiments have proved that an X-ray picture of 256*256 overlapping picture blocks of 64*64 pixels each can be coded sufficiently accurately in the desired number of bits with a division into N=4 segments.

Figure 8:
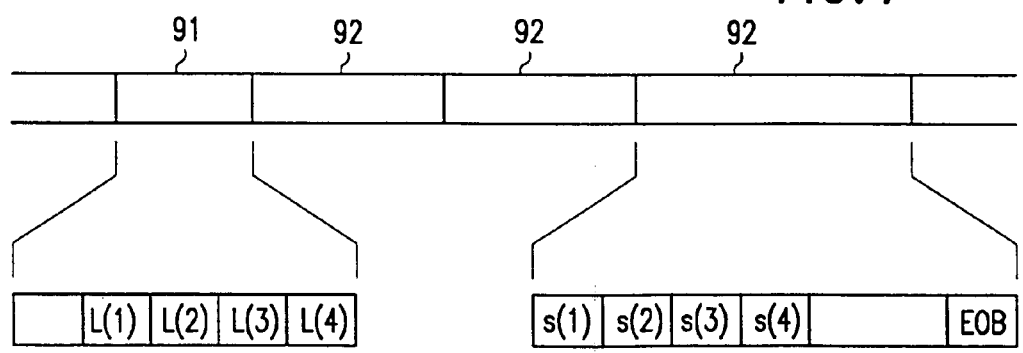
FIG. 8 shows a possible division of the digital picture format of the coded signal.

Reverting to FIG. 1, it appears that the latch signal L(n), which is representative of the segment boundaries, and the step size s are combined in a multiplexer 6 with the bit stream produced by encoder 4. FIG. 8 shows a possible division of the digital picture format thus obtained. The picture signal further has a header 91 and a series of coded picture blocks 92. The segment lengths L(n) applying to the picture are accommodated in the header. Each coded picture block subsequently comprises, for each segment, the relevant step sizes s(n), the coded coefficients and an end-of-block code EOB.

Figure 9:
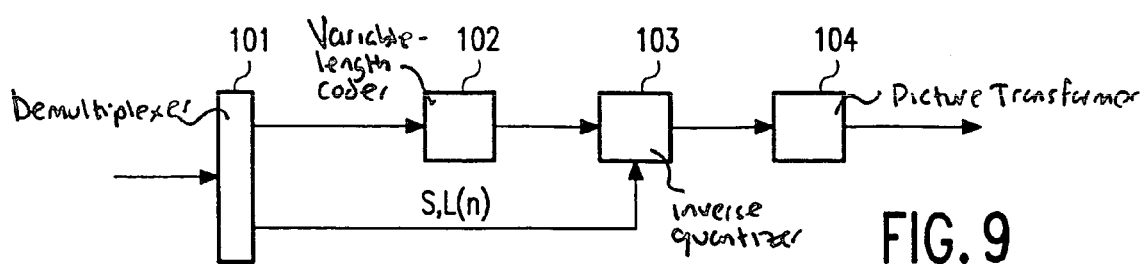
FIG. 9 shows a device for decoding video pictures according to the invention.

FIG. 9 shows a device for decoding the picture signal. The device comprises a demultiplexer 101 for splitting, on the one hand, the picture signal into variable-length codewords representing coefficients, and the step sizes s and segment lengths L(n) on the other hand. The variable-length codewords are applied to a variable-length decoder 102 which applies the quantized coefficients to an inverse quantizer 103. The inverse quantizer reproduces the series of coefficients in dependence upon the step size s in the segment defined by L(n). The series of coefficients is subsequently retransformed by an inverse picture transformer 104 to a picture block in the pixel domain.

The invention claimed is:

1. A device for coding video pictures, the device comprising:
   first dividing means for dividing a video picture into one or more picture blocks;
   a picture transformer for obtaining a series of coefficients from a picture block of the video picture;
   a quantizer for quantizing the series of coefficients with a step size (s);
   an encoder for coding the series of coefficients;
   second dividing means for dividing the series of coefficients into one or more sub-series of coefficients and for determining a sub-target value ($R_t(k,n)$) for a number of bits per sub-series of coefficients; and
   control means for controlling the step size (s) based on a target value ($R_t(k)$) for a number of bits per series of coefficients, the control means being adapted to control a step size for each sub-series of coefficients in accordance with a corresponding sub-target value ($R_t(k,n)$) for the sub-series of coefficients.

2. A device for decoding a coded picture signal comprised of one or more coded picture blocks, the device comprising:
   a decoder for obtaining a series of quantized coefficients from a coded picture block;
   an inverse quantizer for reproducing transform coefficients from the quantized coefficients in response to an applied step size (s);
   a picture transformer for transforming the reproduced transform coefficients into a picture block; and
   means for receiving a parameter (L(n)) indicating how the series of quantized coefficients is divided into sub-series;
   wherein the inverse quantizer is adapted to reproduce the transform coefficients for each sub-series of quantized coefficients in accordance with a corresponding step size for the sub-series.

3. A picture signal comprising:
   coded picture blocks each having series of quantized coefficients;
   a step size with which the coefficients have been coded;
   a parameter (L(n)) indicating how each series of quantized coefficients of a picture block is divided into sub-series; and
   a step size (s(n)) for each sub-series of quantized coefficients.

4. A method of coding video pictures, the method comprising the steps of:
- dividing a video picture into one or more picture blocks;
- transforming a picture block into a series of coefficients;
- quantizing the series of coefficients with a step size;
- coding the series of coefficients; and
- controlling the step size in accordance with a target value ($R_t(k)$) for the number of bits per series of coefficients;
- wherein the series of coefficients is divided into sub-series each having a sub-target value ($R_t(k,n)$) for the number of bits per sub-series, and wherein the step size per sub-series is controlled in accordance with a corresponding sub-target value.

5. A method of decoding a coded picture signal comprised of one or more coded picture blocks, the method comprising the steps of:
- obtaining a series of quantized coefficients from a coded picture block;
- performing inverse quantizing on the series of quantized coefficients in response to an applied step size (s) so as to reproduce transform coefficients;
- transforming the reproduced transform coefficients into a picture block; and
- receiving a parameter ($L(n)$) which indicates how the series of quantized coefficients is divided into sub-series;
- wherein the transforming step reproduces transform coefficients for each sub-series in accordance with a corresponding step size for the sub-series.

* * * * *